Figure 1:
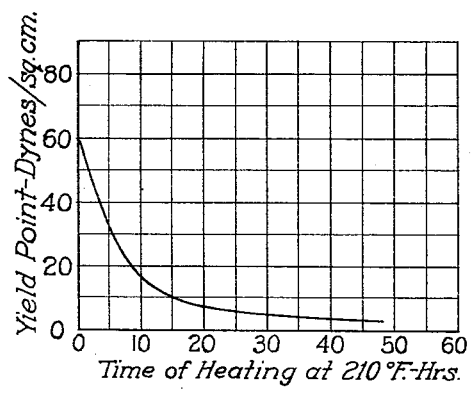

July 12, 1938. P. H. JONES ET AL 2,123,282
PROCESS FOR RECONDITIONING DRILLING FLUIDS
Filed Jan. 20, 1936

INVENTORS
P.H.Jones & E.C.Babson
BY Philip Subkow
ATTORNEY.

Patented July 12, 1938

2,123,282

UNITED STATES PATENT OFFICE 2,123,282

PROCESS FOR RECONDITIONING DRILLING FLUIDS

Philip H. Jones and Edmund C. Babson, Los Angeles, Calif., assignors to Union Oil Company of California, Los Angeles, Calif., a corporation of California Application January 20, 1936, Serial No. 59,890

8 Claims. (Cl. 255—1)

This invention resides in a process for reconditioning drilling fluids employed in earth borings such as gas and oil wells. This invention resides more particularly in a process for reconditioning drilling muds employed in the rotary method of drilling wells, whereby sand, cuttings and gas are continuously removed from drilling muds which would ordinarily tenaceously retain them.

The ability of mud to hold up cuttings and to prevent particles that cave off the side of the hole from falling down the hole while circulation is suspended is a function of the yield point shear strength and effective viscosity of the mud. At the same time the difficulty of reconditioning the mud by freeing it of sand, cuttings and gas is also a function of the yield point shearing strength and effective viscosity of the mud. Hence these two conditions obtaining with mud of high shear strength have heretofore been incompatible.

Objects of this invention are therefore to provide a process for continuously removing sand, cuttings and gas from viscous and thixotropic drilling fluids of high shearing strength, from which such removal is ordinarily accomplished only with difficulty. Such continuous reconditioning of the mud makes it possible to maintain a uniform density and quality of mud and to reduce the degree of gas cutting to a minimum.

Most drilling fluids or muds behave as plastics when subjected to shearing stresses. The stress required to shear such a material is substantially a straight line function of the rate of shear, or in other words, the effective viscosity is a straight line function of the rate of shear. This shearing force is thus a counterpart of the viscosity of a liquid in which the shearing force is also a straight line function. Here, however, the analogy between the plastic and the liquid ceases. The plastic differs from the liquid in that it is found to have an initial shearing stress or yield point which is a finite value greater than zero while the true liquid has no initial yield point. This means then that when a shearing force is applied to a plastic the force must reach a considerable initial value before any flow will take place while flow will be initiated in a true liquid by any finite shearing force however small in magnitude.

Another dissimilarity between liquids and certain plastics, particularly colloidal plastics, is found in the thixotropic properties which the latter exhibit. Thixotropy may be defined as the gel forming tendency of certain plastics, which results in an increasing yield point over a period of quiescence.

Many drilling muds exhibit these thixotropic characteristics which are common in colloidal plastics.

As stated hereinbefore, one of the important functions of a drilling fluid is to hold the drill cuttings in suspension in the bore hole during extended periods when circulation is interrupted. Such interruptions of circulation may occur during changes of bits, fishing, inclinometer measurements and during numerous other operations associated with deep oil or gas well drilling. Failure of the drilling fluid to hold cuttings in suspension during these interruptions may result in "sticking" drill pipe and the possible attendant damage or loss of drilling tools and drilled hole.

It is obvious then, that if a drilling fluid having properties confined to those of a liquid is employed for drilling, any such interruption such as just described would result in immediate commencement of precipitation of the solids and cuttings from the mud to the bottom of the drill hole, and that if the interruption of circulation was of sufficient duration, a large quantity of settlings would accumulate therein.

It is highly fortunate and desirable that most drilling fluids possess the hereinbefore discussed properties of plasticity and thixotropy which makes possible the interruption of circulation for indefinite periods without settling the cuttings in the drill hole to any detrimental extent.

However, these properties of plasticity and thixotropy while desirable for preventing the settling of the cuttings within the bore hole of the well are opposed to the efficient separation of the same cuttings and gas from the circulating drilling fluid while at the surface outside of the well.

The separation of cuttings and gas from drilling fluids at the surface has been accomplished with varying degrees of success by screening or centrifuging or passing the drilling fluid through a ditch or tank at a very low velocity where cuttings could settle. The separation by these methods could be greatly accelerated and more thorough if the drilling fluid at this point in its circuit did not possess the beforementioned properties of holding cuttings and gas in suspension but instead possessed a low yield point, only slight viscosity, and no thixotropic properties. These desirable characteristics, if uniformly present throughout the circulating drilling mud, as stated before, would, on the other hand, be opposed to those characteristics most desirable for the drilling fluid while it is within the bore hole, wherewith the proper suspension of the cuttings would be assured.

It has been discovered that prolonged heating of a thixotropic plastic drilling fluid ordinarily having a high yield point and a high effective viscosity such as drilling mud, will reduce its yield point nearly to zero and very materially reduce its viscosity.

Table I and Fig. 1 illustrate the effect of such prolonged heating upon the yield point of two typical thixotropic drilling muds.

Table I

| Treatment | Yield point dynes/sq. cm. |
|---|---|
| None (prior to treatment) | 22 |
| Heated 48 hours at 212° F | 2 |

Fig. 1 graphically illustrates the relationships between the time of heating at the specified temperature and the resultant yield point of the drilling mud.

Figure 2:
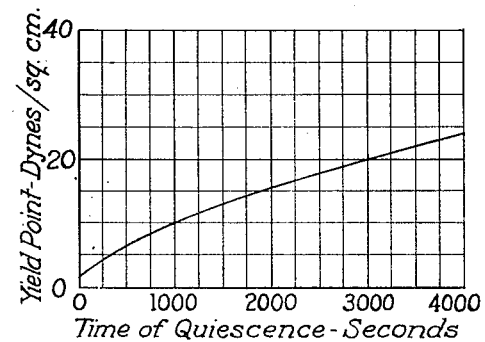

It has also been discovered that the thixotropic drilling mud thus heat-treated and imparted a resulting low yield point may have its original yield point substantially restored by quiescent standing for a period of time during which its thixotropic properties may take effect. Fig. 2 diagrammatically illustrates the relationship between time of quiescence and yield point for a typical drilling mud which has been previously heat-treated as described above.

If this mud which has been imparted a low yield point by prolonged heating is subsequently maintained under slight agitation its thixotropy is somewhat retarded in effect and its return to higher yield points is delayed even though material cooling is allowed to take place.

Moreover, it has also been discovered that agitation has a somewhat similar effect to heating in reducing the yield point and shear strength of thixotropic muds. The quantitive reduction in yield point of a thixotropic mud appears to be a function of degree of violence and time of agitation. The resultant viscosity of such a thixotropic mud subject to agitation appears to be that value resulting from an equilibrium between the gel forming rate of the mud and the gel breaking down action of the agitation.

This effect of heating and agitation upon muds has been utilized to advantage to aid in effecting a separation of sand, cuttings and gas from the drilling mud at the surface, before recirculating it to the drill hole.

The process for treatment of the drilling mud taking advantage of the hereinbefore described characteristics of thixotropic mud is as follows:

A portion of the returning recirculating mud issuing from the top of the drill hole laden with sand, cuttings and/or gas is heated at a temperature of 212° F. for a period of approximately 48 hours in a storage tank where simultaneous mild agitation can be applied. During this time the yield point of the mud is reduced by the combined effect of prolonged heating and agitation. However, either prolonged heating or agitation alone may be here employed to effect the reduction in yield point and viscosity of the mud. At this point in the process a portion or all of the separable material may be settled from the heated mud of reduced yield point. Following this prolonged heat treatment the mud may be cooled with continued agitation, and with the resultant reduction in viscosity upon such cooling additional separable material may be settled out while maintaining slight agitation. The separation of cuttings and gas from the cooled mud is effected in any suitable storage tank, or reservoir in which mild agitation may be maintained or in a ditch through which the mud is allowed to flow slowly.

After the cooled mud has been freed of cuttings and gas by sedimentation and separation it may be reheated to raise the viscosity and increase its carrying ability for cuttings before being returned for recirculation through the well. Such reheating is necessary only where the subsurface temperatures in the well are low. However, in many deep wells the subsurface temperatures are sufficiently high that external heating is unnecessary.

Upon interruption of the circulation in the well of the thus treated mud, the thixotropic properties still remain effective and substantially unimpaired in immediately effecting an increase in yield point of the mud during the resulting quiescence. The continued holding power of the treated mud for cuttings in the bore hole is thus insured.

While the majority of drilling muds are of the thixotropic character described hereinbefore, some of the drilling muds however are found to be substantially nonthixotropic, that is, they do not have strong gel forming tendencies which increase their yield points during extended quiescence.

Such nonthixotropic muds, like the thixotropic muds, exhibit a substantial reduction in yield point and viscosity upon prolonged heating. The yield point of the heat treated non-thixotropic mud, however, upon subsequently standing quiescent, does not return in any appreciable degree toward the original value which it had before heat treating, without undergoing special treatment.

Figure 3:
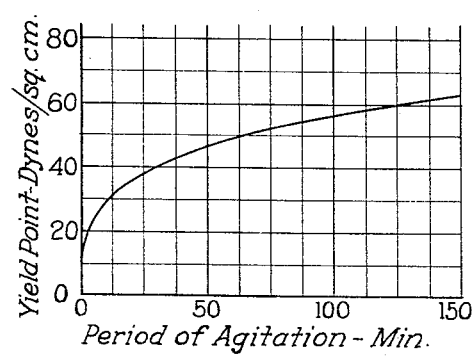

It has been discovered that vigorous agitation of the heat-treated non-thixotropic mud will restore its yield point to substantially its original value. Table II and Fig. 3 illustrate the effect of such heating and agitation upon a typical non-thixotropic mud.

Table II

| Treatment | Yield point dynes/sq. cm. | Funnel viscosity (a) sec. at 80° F. |
|---|---|---|
| Original sample | 67 | 27.5 |
| After 24 hours at 210° F | 13.8 | 24.5 |
| Agitated 3 hours | 64.6 | 27.0 |

(a) A definition of funnel viscosity may be found in A. P. I. paper presented October 30, 1930 by H. N. Marsh.

Figure 4:
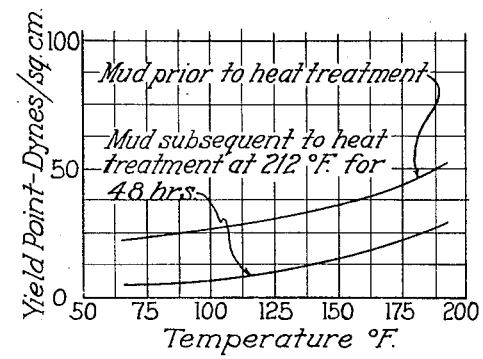

The process of this invention for treating nonthixotropic muds to free them of sand, cuttings and gas takes advantage of these hereinbefore described characteristics. The mud laden with cuttings and/or gas, issuing from the top of the drill hole is heated to a temperature of approximately 210° F. for a period of from 24 to 48 hours in a storage space where settling and separation of the extraneous suspended matter and/or gas is accomplished due to the lowered yield point and viscosity of the heat treated mud. Subsequent to the heat treatment the mud may be cooled to normal temperatures to further reduce the yield point as indicated in character by Fig. 4, whereupon further separation of extraneous matter may be effected.

The thus heat treated non-thixotropic mud as explained hereinbefore, will not return to its original yield point upon standing quiescent but will retain the low yield point acquired as a result of the prolonged heat treatment. This property is favorable to effective separation and reconditioning of the mud. However, the return of this mud to the drill hole without restoration of the yield point would be undesirable since such a mud would not possess the requisite holding power for cuttings.

The heat treated non-thixotropic mud, therefore, before its return circulation to the drill hole is agitated vigorously with a mechanical mixer for a period of approximately three hours whereupon the yield point is restored to a value which is suitable for its proper functioning as a drilling fluid capable of supporting cuttings within the drill hole during suspended circulation without excessive settling.

It has also been advantageous in some cases to heat the treated non-thixotropic mud before returning it to the bore hole to further raise the yield point as described hereinbefore in connection with the treatment of thixotropic muds where the drilled formation temperature is low. Where the drilled formation temperature is high, such heating before returning the mud to the drill hole may be unnecessary.

The relationships of temperature, time of heating, time of agitation, yield point and effective viscosity of muds as dealt with and illustrated herein are characteristic of typical thixotropic and non-thixotropic muds, but the quantitative values of these characteristic relationships vary somewhat for different muds from various sources. Of the typical muds discussed herein one exhibits strong thixotropic properties while another exhibits weak or negligible thixotropic properties. Muds of intermediate characteristics will obviously have characteristics intermediate those illustrated herein. Other slight deviations in characteristics in different drilling muds are observed, the reasons for which are not entirely understood, but the hereinabove discussed mud characteristics remain in general, valid.

It is obvious that the hereinbefore described processes of treating muds for the removal of sand and cuttings is equally advantageous for the simultaneous separation of gas and prevention of mud gas-cutting. The common methods for reconditioning muds as at present employed, such as vibrational screening and centrifuging are also augmented in effectiveness by such supplementary mud treatment.

The foregoing is illustrative of processes for reconditioning drilling fluids, and the invention is not limited thereby but may include any process and any fluid material with which the same is accomplished within the scope of the claims.

We claim:

1. In a process for drilling wells the steps comprising withdrawing drilling mud laden with cuttings from the drill hole, reducing the yield point of said withdrawn mud by prolonged heating to a temperature of approximately 212° F., separating extraneous matter from the mud of reduced yield point and returning the thus treated mud to the drilling well.

2. In a process for drilling wells, the steps comprising withdrawing drilling mud laden with cuttings from the drill hole, heating said withdrawn mud to a temperature of approximately 212° F. to reduce the yield point of said mud, separating cuttings from the thus heated mud, maintaining the mud from which cuttings have been removed quiescent for a period of time sufficient to settle and separate additional cuttings from the mud, agitating said mud from which cuttings have been separated to restore a portion of its original yield point and returning the thus treated mud to the drill hole.

3. In a process for drilling wells the steps comprising withdrawing drilling mud laden with cuttings from the drill hole, heating said withdrawn mud to a temperature of approximately 212° F. and for a sufficient time to reduce the yield point of said mud, agitating said thus heated mud to maintain the lowered yield point attained by said heating, separating cuttings from the mud during the agitation, and returning the thus treated mud from which cuttings have been separated to the drill hole.

4. A process according to claim 3 in which the heat treated mud from which cuttings are being separated is cooled to further reduce the yield point and effective viscosity of the mud thereby further facilitating the separation of cuttings.

5. In a process for drilling wells the steps comprising withdrawing drilling mud laden with cuttings from the drill hole, heating said withdrawn mud to a temperature of approximately 212° F. to reduce the yield point of said mud, separating cuttings from the thus heated mud, subsequently agitating the said mud and returning the agitated mud from which cuttings have been separated to the drill hole.

6. A process according to claim 5 in which the mud prior to being agitated is cooled to further reduce the yield point.

7. A process according to claim 3 in which the heat treated mud from which cuttings are being separated is cooled to further reduce the yield point and effective viscosity of the mud thereby further facilitating the separation of cuttings and in which the mud prior to being returned to the drill hole is reheated to raise its effective viscosity.

8. In a process for drilling wells the steps comprising withdrawing drilling mud ladened with cuttings from the drill hole, reducing the yield point of the said withdrawn mud by prolonged heating at a temperature of approximately 212° F. for at least approximately twenty-four hours, allowing cuttings to settle from the mud and returning the thus treated mud to the drilling well.

PHILIP H. JONES.
EDMUND C. BABSON.